United States Patent [19]

Degenhardt

[11] Patent Number: 4,675,271
[45] Date of Patent: Jun. 23, 1987

[54] PERSISTENT SCREEN FOR RADIATION IMAGES

[75] Inventor: Heinz Degenhardt, Erlangen, Fed. Rep. of Germany

[73] Assignee: Siemens Aktiengesellschaft, Berlin and Munich, Fed. Rep. of Germany

[21] Appl. No.: 904,771

[22] Filed: Sep. 5, 1986

Related U.S. Application Data

[63] Continuation of Ser. No. 703,152, Feb. 19, 1985, abandoned.

[30] Foreign Application Priority Data

May 21, 1984 [DE] Fed. Rep. of Germany ....... 3418924

[51] Int. Cl.⁴ ................................................. G03C 5/17
[52] U.S. Cl. ....................................... 430/139; 430/6; 430/7; 430/966
[58] Field of Search ................. 430/139, 966, 6, 7; 252/483, 486, 487

[56] References Cited

U.S. PATENT DOCUMENTS

| | | | |
|---|---|---|---|
| 3,300,311 | 1/1967 | Kennard et al. | 430/139 |
| 3,303,341 | 2/1967 | Fram et al. | 430/139 |
| 3,859,527 | 1/1975 | Luckey | 250/327 |
| 3,883,747 | 5/1975 | Murashige et al. | 250/483.1 |
| 3,975,637 | 8/1976 | Ikedo et al. | 250/330 X |
| 4,028,550 | 6/1977 | Weiss et al. | 430/6 X |
| 4,090,085 | 5/1978 | Shimiya et al. | 250/483.1 |
| 4,299,904 | 11/1981 | Pettijohn et al. | 430/139 |
| 4,507,379 | 3/1985 | Tsuchino et al. | 430/139 |

FOREIGN PATENT DOCUMENTS

| | | |
|---|---|---|
| 0021174 | 1/1981 | European Pat. Off. . |
| 2613824 | 10/1977 | Fed. Rep. of Germany ...... 430/139 |
| 2807398 | 8/1979 | Fed. Rep. of Germany . |
| 1190421 | 5/1970 | United Kingdom . |

OTHER PUBLICATIONS

Article, "Uvitex OB", 16 pages.

Primary Examiner—John E. Kittle
Assistant Examiner—Mukund J. Shah
Attorney, Agent, or Firm—John Francis Moran

[57] ABSTRACT

The invention relates to persistent screens where the image to be stored is stored in a layer (3) which contains as an active substance an illuminable luminophor (5) and which is tinted to increase the picture sharpness. The luminophor (5) is a rather small quantity of organic and/or inorganic UV luminophor material. In this connection, it has been found to be desirable to at least reduce the light loss caused by the tinting. To this end, the invention avoids dispersions of the scanning beam (14) in the persistence layer (3) during scanning by admixing to the luminophor (5) an UV luminophor (6) as well as an optical brightener (7). It has also been found appropriate to apply the persistence layer (3) on a substrate (2), such as a polyester foil, which is tinted with a substance that absorbs the light of the scanning beam (14) used for illuminating the layer (5). Such a screen utilizing the inventive principles is particularly useful in medical technology applications.

1 Claim, 2 Drawing Figures

PERSISTENT SCREEN FOR RADIATION IMAGES

CROSS-REFERENCE

This is a continuation of Ser. No. 703,152 filed Feb. 19, 1985, now abandoned.

BACKGROUND OF THE INVENTION

This invention relates to persistent screens for radiation images, and more particularly, the invention relates to screens which provide improved sharpness without a noticeable signal loss. Such screens of this general type are known for instance from European patent application No. 00 21 174.

The picture sharpness of persistent fluorescent screens which contain in their persistence layer as an active substance a barium halide, such as barium fluorochloride (BaFCl) or a barium fluorobromide (BaFBr), is measured, as a rule, with few line pairs (Lp) per millimeter, say 3 Lp/mm. To increase the definition according to the above-mentioned European patent application No. E-OS 00 21 174, dyes are admixed to the persistence layer. But the dyes or pigments used, which themselves show no light emission, unfortunately absorb light and thereby reduce the image signals produced during illumination.

SUMMARY OF THE INVENTION

An object of the invention is to increase significantly the picture sharpness on a persistent screen of the type including a luminophor and a dye while reducing signal loss.

The inventive screen proceeds from the finding that the picture sharpness of persistent luminescent screens can be increased considerably, without a signal loss being noticeable, if special care is given to avoiding dispersions of the scanning beam in the persistent layer. This is achieved, for example, by adding to the actual persistence material a small quantity of organic and/or inorganic UV luminophors.

The picture sharpness of a screen with 60 mg luminophor per $cm^2$, e.g. BaF(Cl, Br)Eu:Sr, can thus be increased from 3 to 6 Lp.mm. The proportion per 100 g of persistent luminophor here is 1 to 20 g, preferably 5 g, barium silicate UV luminophor of the formula $BaSi_2O_5/Pb$ with its fluorescence maximum at 351 nm and 1 to 20 mg, preferably 3 mg, of an organic UV luminophor, which is an optical brightener with an absorption maximum at 375 nm and a fluorescence maximum at 435 nm. This brightener, which is described in CIBA-GEIGY's publication "Uvitex OB" issued as "Circular No. 2205/3" under the notation "36044 Printed in Switzerland 700.531", involves derivatives of diaminostilbene disulfonic acid.

The organic UV luminophor reduces, surprisingly, the dispersion in the persistent screen with simultaneous excitation by the persistent luminophor. The optical brightener serves as wavelength shifter for adaptation to the sensitivity of a photosensor (multiplier) connected to the persistent screen.

The picture sharpness can be increased also by staining or tinting the interface between the persistent layer and the substrate to prevent dispersions of the scanning light used in illuminating the persistent screen. For this purpose it has been found to be desirable to provide the support of the persistent layer with a violet tint, in particular if a laser scanner is used, in order to prevent dispersion of the laser beam. To this end, the dye is appropriately applied on the screen support before the persistent layer is applied.

For the tinting of the background of the persistent layer, a violet dye described as dioxazin pigment under No. 51319 in the "Colour Index" has proved especially useful. In the company publication "Hostapemviolett RL spezial", published as "Hoe. 4015 (Musterteil A)" of Fabrwerke Hoeschst AG, 6230 Frankfurt (Main) 80, this substance is termed as a dioxazin pigment which is a bluish carbazol violet of extremely high color intensity.

It has also been found desirable to provide between the support and the persistent layer a 20 $\mu$m thick layer of titanium dioxide ($TiO_2$) which is dyed with the violet dye. By using 0.1 to 1 g dye per 100 g titanium dioxide binder, a suitable intensive tint is obtained. Expediently the dye is dissolved in the titanium dioxide binder and is applied together with it. A favorable mixture results from 0.6 Hostapermviolett RL spezial dissolved in 200 ml methylglycol acetate, to which 20 g polyvinyl acetate are then added. Lastly 100 g titanium dioxide are stirred into this lacquer to be well dispersed. The liquid lacquer thus obtained can be poured onto a polyester foil as substrate, using a pouring device with a pouring slit of 0.1 $\mu$m, and dried at +80° C., until there results a uniformly covering background layer, i.e. one about 20 nm thick.

The thoroughly dried tinted layer is then covered with the actual luminescent persistence layer, in that a dispersion is applied which in addition to being a solvent and binder also contains the persistence luminophor and a mixture of inorganic and organic UV luminophor. As a solvent preferably butyl acetate is used, and as binder, polymethyl-methacrylate. The quantities are expediently selected so that after drying a solid luminescent persistence layer adhering on the background layer is obtained, which has a luminophor coverage of about 60 to 80 mg BaF(Cl,Br):Eu per $cm^2$.

A suitable mixture which fulfills this purpose consists of lacquer which, in a solution of 3 mg optical brightener and
40 g polymethyl methacrylate
contains dispersed in
200 ml methylglycol acetate
100 g persistence luminophor as well as
5 g barium silicate luminophor.

With the aid of a pouring device with a pouring slit of 0.5 $\mu$m, this pouring lacquer yields on the background layer a suitable persistence layer.

Lastly the luminescent persistence layer is given, after drying, a dense protective layer about 10 nm thick. It can be obtained by application of a lacquer layer which results in a moistureproof cover. Such a lacquer consists preferably of a solution of 10 g polyvinyl chloride (PVC) in 100 ml methylglycol acetate. The application and composition of the protective lacquer is chosen so that no impairment of the previously aplied luminescent persistence layer is caused.

As a support which can be used substrates known from the manufacture of luminescent screens, for instance, is a plastic foil which is 250 nm thick and consists of polyester.

BRIEF DESCRIPTION OF THE DRAWING

Details and advantages of the invention will become apparent by referring to the embodiments illustrated in the drawing wherein.

Figure 1:
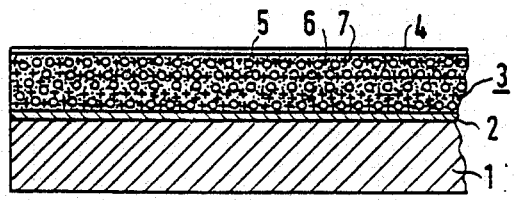
In FIG. 1, a transverse section of a screen according to the invention is depicted; and In FIG. 2, an application of a screen utilizing the inventive principles is illustrated in a radiodiagnostics system.

Other features and advantages of the invention will become apparant to those skilled in the art by considering the detailed description in conjunction with the drawing.

DETAILED DESCRIPTION

In FIG. 1, a screen support is shown which is 250 nm thick sheet of polyester. Applied on this screen is a background layer 2 which includes a polyvinyl acetate binder containing 10 mg of titanium dioxide per cm$^2$. In addition, this layer 2 is dyed violet. Lying on layer 2 is the actual persistence layer 3, which is covered with a protective layer 4. In layer 3, which contains a binder of polymethyl methacrylate, are included per cm$^2$ of luminescent area 60 to 80 mg BaF(Cl,Br):Eu as luminophor and 4 mg BaSi$_2$O$_5$:Pb luminophor as inorganic UV luminophor 6 as well as 0.01 mg of an optical brightener 7. The protective layer 4 is 10 nm thick and consists of PVC. The layers 1 to 4 were produced according to the foregoing stated formulation.

Figure 2:
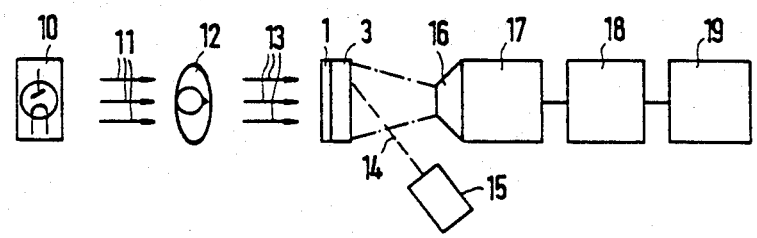

In FIG. 2, an X-ray source 10 emanates X-rays 11 which pass through a body 12 under examination. Subsequently the rays 13 affected by the body 12 produce a record in the persistence layer 3 by passing through the support layer 1.

The record thus obtained can subsequently be illuminated with a well focussed beam 14 from a laser scanner 15. The light thus obtained in layer 3 then passes into the lens 16 of a television camera 17. The output signals of the camera are then applied to a signal processing system 18. The output of a system 18 which are appropriately processed signals are presented to a reproduction system 19. The latter may be, for instance, a television set with a fluorescent screen on which the stored image can be reproduced and preserved, for instance by photographing. Alternatively, electronic storing may take place from the system 18.

The effect of the invention is based on the fact that during scanning by means of the beam 14 the activated light in the layer is prevented from lateral propagation by the admixed inorganic UV luminophor, the signal is amplified by the organic UV luminophor, and lastly dispersion of the well focused scanning laser beam 14 is prevented by the tinting of the background layer 2.

There has thus been shown and described a novel persistent screen for radiation images which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. A persistent screen for radiation images comprising a luminescent layer consisting of a barium fluoride luminophor and a dye in a binder, and wherein the dye consists of a combination of an optical brightening organic and a barium silicate inorganic UV luminophor and absorbs scanning dispersions and is transparent to illuminating light and the barium fluoride luminophor consists of the formula BaF(Cl,Br)Eu:Sr, there being admixed 100 g of the barium fluoride luminophor, 1 to 20 g of the barium silicate inorganic UV luminophor whose fluorescence maximum occurs substantially at 351 nm, and 1 to 20 mg. of the optical brightening organic UV luminophor having a fluorescence maximum substantially at 435 nm.

* * * * *